United States Patent
Lowry

[11] Patent Number: 5,247,760
[45] Date of Patent: Sep. 28, 1993

[54] FISHING LINE CUTTER/CLAMP

[76] Inventor: Kirt E. Lowry, 1150 South Rd., Clinton, Ind. 47842

[21] Appl. No.: 959,064
[22] Filed: Oct. 9, 1992
[51] Int. Cl.⁵ .............................. A01K 89/00
[52] U.S. Cl. ......................................... 43/25
[58] Field of Search ............. 43/4, 25, 25.2; 30/232, 30/269, 296; 7/106

[56] References Cited

U.S. PATENT DOCUMENTS

| | | | |
|---|---|---|---|
| 2,715,292 | 8/1955 | Williams | 43/25.2 |
| 2,804,711 | 9/1957 | Kozar | 43/25 |
| 3,128,023 | 4/1964 | Cook | 43/25 |
| 3,521,393 | 7/1970 | Gordon | 43/25 |
| 4,648,197 | 3/1987 | Weiberg | 43/25 |
| 4,726,140 | 2/1988 | Mears | 43/25 |
| 4,730,409 | 3/1988 | Mitchell | 43/25 |

FOREIGN PATENT DOCUMENTS

| | | | |
|---|---|---|---|
| 143868 | 8/1903 | Fed. Rep. of Germany | 30/232 |
| 452858 | 1/1913 | France | 30/232 |

Primary Examiner—Kurt C. Rowan
Attorney, Agent, or Firm—H. John Barnett

[57] ABSTRACT

A cutting tool and clamp for cutting a fishing rig or lure from the end of a fishing line and holding the line threaded through the line guides on the fishing rod in a ready condition for the next use. Removing the hooks from the end of the line prevents tangles and injuries.

2 Claims, 1 Drawing Sheet

FISHING LINE CUTTER/CLAMP

BACKGROUND OF THE INVENTION

1. Field of the Invention

This invention is directed to an accessory for rod and reel fishing gear which eliminates the need to rethread the line through the line guides between fishing sessions. The cutter/clamp accessory cuts the end of the line adjacent the fishing rig or lure, and clamps the line at the rod tip, saving time when the equipment is made ready for the next fishing session.

2. Description of the Related Art

The following patents relate to fishing tackle accessories:

| Patent Number | Inventor/Owner/Title | Date |
| --- | --- | --- |
| 3,782,023 | Hendrickson | 1974 |
| 3,925,920 | Walker | 1975 |
| 4,031,652 | Johnson | 1977 |
| 4,823,498 | Banta | 1989 |
| 5,025,585 | Powell | 1991. |

Banta '498 does not show the whole combination of a cutting/clamping device. In Johnson '652, the line release is for a different purpose. Powell '585 is directed to a variety of cutting devices, but there is no mention of line clamping or holding. Hendrickson '023 is directed to a reel-mounted releasable line clamp. Walker '920 is a submerged part of a downrigger used in trolling to release the fishing line when a fish strikes. Powell '585 fishing line cutter can be mounted on a rod or on a reel. It does not clamp the line. Hendrickson '023 clamps the line, but does not cut it.

Many references show line cutters, and others show line clamps, but none of the references show the combination. Applicant's invention is directed to a combination cutter/clamp which is useful between fishing sessions to avoid the step of rethreading the line through the line guides of the fishing rod.

SUMMARY OF THE INVENTION

This invention is directed to a combination fishing line cutting tool and line clamp for cutting a fishing rig or lure from the end of a fishing line and holding the line threaded through the line guides of the fishing rod in a ready condition for the next use. Removing the hooks from the end of the line prevents tangles and injuries between fishing sessions, but rethreading the line through the line guides is avoided. Rethreading before each fishing session can be cumbersome, especially in the dark and with longer rods in a boat or on the edge of brushy streams.

The cutter/clamp comprises a pair of resiliently biased jaws which support a line cutting means and a line clamping means in such a way that the assembled line may be first clamped and held just beyond the rod tip, and the outer end of the line just beyond the clamping means is cut by the cutting means to remove the fishing rig or lure while holding the uncut portion under tension threaded through the line guides.

Figure 1:
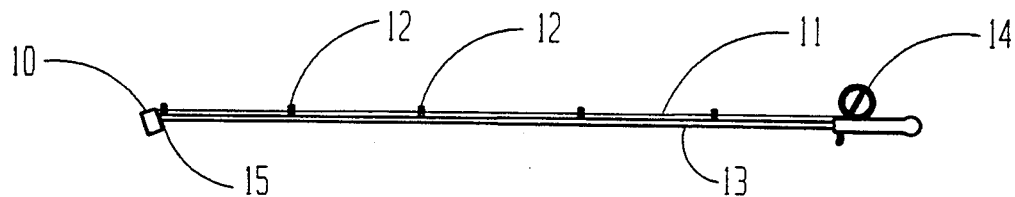
FIG. 1 is a schematic side plan view of an assembled rod and reel with the fishing line threaded through the line guides and clamped under tension by the cutter/clamp.

As seen in the drawings, a cutter/clamp 10 is clamped to fishing line 11 threaded through line guides 12 of fishing rod 13. Fishing line 11 extends onto fishing reel 14 which holds the line 11 under tension to urge the cutter/clamp 10 against rod tip 15.

The cutter/clamp 10 maintains the line 11 threaded through line guides 12 between fishing sessions to keep the rod 13 in readiness for attaching a fishing lure or rig for the next fishing session.

Figure 2:
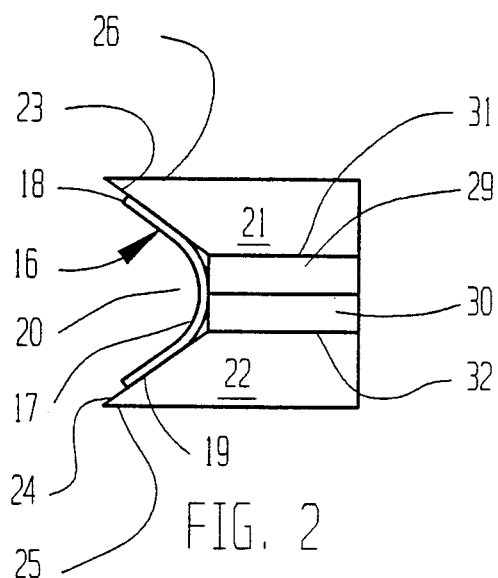
FIG. 2 is an enlarged schematic side view of the cutter/clamp showing the resilient biasing means connecting the opposing jaws and the opposed cutter blades mounted in the opposing jaws.
Figure 3:
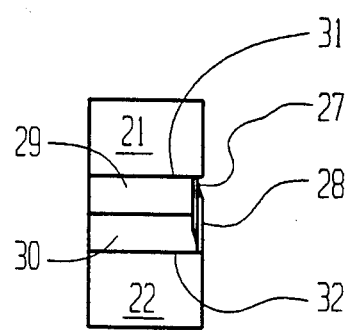
FIG. 3 is an enlarged schematic end view of the cutter/clamp of FIG. 2 showing the overlapping cutter blades and the opposing rubber clamping pads mounted in the opposing jaws of the cutter/clamp.
Figure 4:
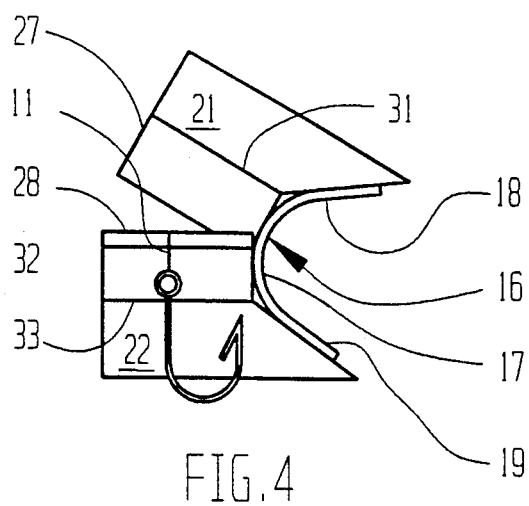
FIG. 4 is an enlarged schematic view of the cutter/clamp viewed from the side opposite FIG. 2, and with the cutter/clamp biased open, ready to cut the fishing line just above the hook.

The cutter/clamp 10 is shown in more detail in FIGS. 2–4. A resilient spring 16 having a mid-portion 17 and two legs 18 and 19 is disposed in a tapered opening 20 between jaws 21 and 22. The tapered opening 20 is defined by tapered inner surfaces 23 and 24 of the jaws 21 and 22. The leg 18 of the spring 16 is fastened to the tapered inner surface 23 of the jaw 21, and the leg 19 is similarly fastened to the tapered inner surface 24 of the jaw 22. When finger pressure is applied to tapered ends 25 and 26 of the jaws 21 and 22, the jaws 21 and 22 move apart and surround a fishing line 11. Cutters 27 and 28 are oppositely mounted on the jaws 21 and 22, respectively. When the jaws 21 and 22 close, the cutters 27 and 28 cut line 11 while line 11 is being clamped between a pair of clamping members defined by rubber pads 29 and 30 which are mounted on the flat surfaces 31 and 32 of the jaws 21 and 22.

The clamping action of rubber pads 29 and 30 holds the line 11 in place threaded through the eye guides 12 of the rod 13 even after the lure, or fishing hook 33 is cut away from line 11. The rod 13 can be safely carried with the cutter/clamp 10 in place on the rod tip 15 without the danger caused by leaving a lure or fishing rig containing hooks on the line.

When the next fishing session is to begin, the line 11 is removed from the cutter/clamp 10 and the lure or fishing rig fastened to the line 11. The usual step of rethreading the line 11 through the line guides 12 is avoided.

What is claimed is:

1. A cutter/clamp for cutting a fishing lure from the end of a fishing line assembled on a fishing rod having a rod tip, and on a reel, comprising:

a pair of manually operable resiliently biased jaw members having flat inner surfaces which are normally biased together;

manually operable cutting means which are normally biased together disposed on the jaw members for cutting the fishing line; and a pair of clamping members also disposed on the jaw members on the flat inner surfaces, and which are also normally biased together for holding the cut fishing line in place between fishing sessions without the fishing lure attached, said cutter/clamp being held at the rod tip by the clamping action of the clamping members on the cut fishing line.

2. A cutter/clamp for first clamping and then cutting a fishing line assembled on a fishing rod comprising:

a pair of complementary jaw members, each jaw member having a tapered end with a tapered inner surface, a tapered opening being defined between the tapered inner surfaces, each jaw member also having a flat inner surface;

a generally V-shaped resilient means having two ends connected by an intermediate portion, the ends of the resilient means being secured to the corresponding tapered inner surface of the complementary jaw members;

a pair of clamping members, each disposed on the respective inner surfaces of the jaw members; and a pair of cutting members, each disposed on the end of the respective jaw member, whereby the assembled line may be clamped, cut and held in place between fishing sessions for safe transport with the fishing hooks removed.

* * * * *